United States Patent [19]

Jackson et al.

[11] 4,422,470

[45] Dec. 27, 1983

[54] FLOW LIMITING VALVE

[75] Inventors: Alan D. Jackson; Dennis J. Stucky, both of Hutchinson, Kans.

[73] Assignee: The Cessna Aircraft Company, Wichita, Kans.

[21] Appl. No.: 394,381

[22] Filed: Jul. 1, 1982

[51] Int. Cl.³ ............................................. F16K 17/34
[52] U.S. Cl. ............................... 137/484.2; 137/484.4; 137/501
[58] Field of Search ............... 137/484.2, 484.4, 484.6, 137/501

[56] References Cited

U.S. PATENT DOCUMENTS

| | | | |
|---|---|---|---|
| 1,994,320 | 3/1935 | McLaughlin | 137/484.2 UX |
| 2,646,078 | 7/1953 | Adams | 137/501 X |
| 2,800,141 | 7/1957 | Hedland | 137/484.2 |
| 2,881,793 | 4/1959 | Lee | 137/501 |
| 3,979,907 | 9/1976 | Paul | 137/101 X |

Primary Examiner—Harold W. Weakley
Attorney, Agent, or Firm—Edward L. Brown, Jr.

[57] ABSTRACT

The invention is an improved pressure compensating flow limiting valve which maintains an optimum performance curve at differing flow rates. The invention is the specific placing of a vent passage in the valve spool immediately downstream of the fluid jet passing across the spool in a metering mode with the vent passage connected to one of the servo chambers which positions the spool. The effect of the exiting fluid jet draws some fluid from the vent passage thereby dropping the pressure level in that servo chamber sufficiently to offset certain dynamic forces on the spool and balance the spring forces on the spool with these forces regardless of the flow rate through the valve.

7 Claims, 2 Drawing Figures

FLOW LIMITING VALVE

BACKGROUND OF THE INVENTION

The present invention relates to hydraulic flow control valves which limit flow at certain levels regardless of the pressure drop thereacross. With the use of hydraulic motors to drive sweeper brooms, combine reels, or any application requiring a set speed, it becomes more apparent that the present state of the art of adjustable flow limiting valves is inadequate. A conventional flow control valve, such as shown in U.S. Pat. No. 3,979,908 (also known in the trade as flow limiting valves), senses a pressure drop across a sensing orifice in the flow path and with that pressure drop balanced against a spring, controls a variable orifice in the flow path to maintain a constant pressure drop across that sensing orifice regardless of the changes of load on the system.

The flow limiters of the prior art can be designed to properly function at a single sensing orifice size. However, they do not efficiently function when the size of the sensing orifice is changed, because the spool closes due to certain dynamic forces on the spool aside from the spring force and servo chamber forces thereon. These dynamic forces include an increased momentum exchange on the valve spool, sometimes also referred to as "Bernoulli effect". These dynamic forces are described in detail in U.S. Pat. No. 4,220,178. The dynamic force must be balanced against the spring force not only in magnitude but in rate of change, and this can be accomplished only at one orifice size in a particular valve.

SUMMARY OF THE INVENTION

The present invention is an improved pressure compensating flow limiting valve which maintains a constant pressure drop across a sensing orifice regardless of the size of the sensing orifice. This is achieved by placing a vent passage in the valve spool immediately downstream of the high velocity fluid jet passing across the spool in a metering mode with the vent passage connected to one of the servo chambers which positions the spool. The effect of the exiting fluid jet, draws some of the fluid from the vent passage thereby dropping the pressure level in that servo chamber sufficiently to offset a portion of certain dynamic forces on the spool and balance the spring force on the spool with these dynamic forces regardless of the flow rate to the valve. While various other techniques have been tried in the prior art, such as amplifying the error with larger diameter spools and special metering, they have not been particularly successful or technically exact. The present invention provides a technique of balancing the forces on the spool so that the spool wil accurately pressure compensate regardless of the flow level desired through the valve.

The placing of the vent passage adjacent the exiting fluid jet causes a pressure drop in the servo chamber which has been shown in lab tests to be substantially linear, with the pressure drop across the metering notches as well as the flow rate therethrough. It may also be shown mathematically that the momentum exchange caused by the high velocity jet passing across the metering notches is approximately linear with flow rate. Therefore, by proper placement of the vent passage, it is possible to add an additional compensating force whose rate of change will just offset the deviation between metering, the rate of change of spring force, and the rate of change of the "Bernoulli effect" at all flow rates. This allows not only the state of the art of adjustable flow control valves to be extended to the point that adjustable flow dividers, as well as flow limiters, may be designed which are substantially independent of pressure drops over any particular flow range.

It is therefore the principal object of the present invention to provide a new and improved flow limiting valve which functions with equal efficiencies at varying flow levels.

Another object of the present invention is to provide a valve spool design utilized in a metering condition with balanced dynamic forces thereon.

These and other more particular objects and advantages of the present invention are specifically set forth and will become apparent from the following detailed description of the preferred form of the invention when read in conjunction with the accompanying drawings.

BRIEF DESCRIPTION OF THE DRAWING

The accompanying drawing illustrates two embodiments of the invention for practicing the principles of the present invention and in which.

DESCRIPTION OF THE PREFERRED EMBODIMENT

Figure 1:
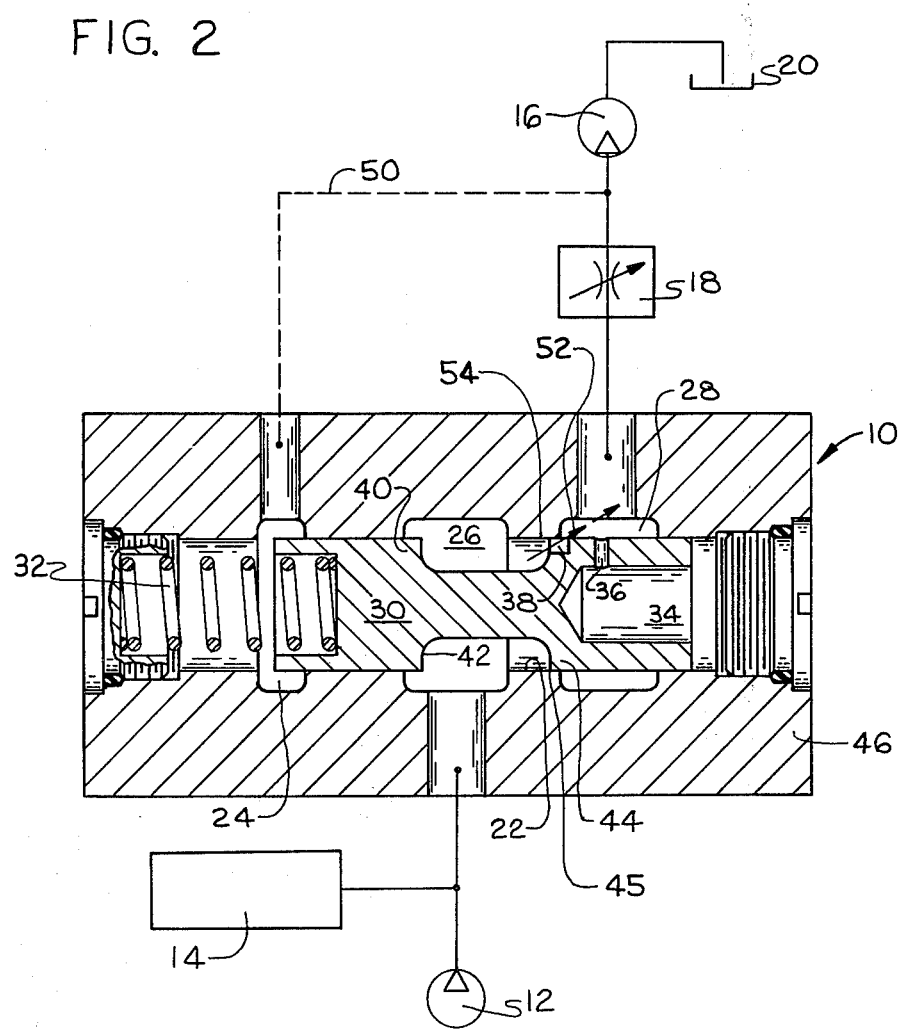
FIG. 1 is a longitudinal sectional view through the flow limiting valve with the remaining components of the hydraulic system shown schematically.

Referring now to the accompanying drawing, and more particularly to FIG. 1, reference numeral 10 generally designates the control valve, also referred to in the prior art as a "flow limiting" or "pressure compensating" valve. The valve 10 comprises a body 46 having a bore 22 therein for receipt of a valve spool 30. Spool 30 is urged in a rightward direction, as seen in FIG. 1, by spring 32 and any pressure in servo chamber 24. Spool 30 is urged in the opposite direction towards a closed position by any pressure in servo chamber 34. The valve 10 is utilized in a hydraulic system supplied by any type of fixed or variable displacement pump 12 which supplies other functions 14, along with motor 16, which is controlled by valve 10 of the present invention.

The function of motor 16 would typically be, a combine reel drive, which must be turned at a constant speed regardless of the pressure level demanded by the other functions of the hydraulic system. The pressurized pump fluid enters the valve 10 through pressurized cavity 26 flowing across notch 38 in spool 30 and out exhaust cavity 28. Before reaching motor 16, the flow passes through a variable orifice 18 which controls the speed at which motor 16 is to operate. The pressure drop across variable orifice 18 is sensed downstream in sensing line 50 which connects with a servo chamber 24 acting in conjunction with spring 32 to move spool 30 in a rightward direction. The pressure upstream of variable orifice 18 is sensed in cavity 28 through passage 36 to servo chamber 34. Chamber 34 urges the spool 30 in a leftward direction in opposition to spring 32 and chamber 24. Spool 30 is defined by spool groove 42 separating land 40 from metering land 44. Located in the edge of land 44 is one or more metering notches 38 which are conventional in shape. Cavities 26 and 28 are separated by a sealing land in bore 22.

Spool 30 will move to the right of the FIG. 1 position in the absence of any pressures in either chamber 24 or 34, due to the force of spring 32, fully opening groove 42 to flow thereacross.

OPERATION

In a typical installation, motor 16 would turn the reel on an agricultural combine. The operator would set variable orifice 18 at a certain sized opening to achieve a certain reel speed which would hold that speed regardless of load changes on motor 16 or pump 12.

As flow begins to flow from pump 12 to motor 16, spool 30 will be in a position to the right of that shown in FIG. 1 with spool groove 42 fully open. As the flow to motor 16 crosses variable orifice 18, a pressure drop is created thereacross which is sensed downstream on the left end of spool 30 (through servo chamber 24) and upstream on the right end of spool 30 (via vent passage 36 and servo chamber 34). When the pressure drop across orifice 18 is sufficient to overcome the initial force of spring 32, the spool 30 will begin to move to the left closing land 44 and creating a second orifice in the flow path to motor 16, in a position approximate that illustrated in FIG. 1. If variable orifice 18 is not manually changed, spool 30 will position itself to maintain a constant pressure drop across orifice 18 regardless of the condition. For example, if the load on motor 16 lightens and the motor begins to speed up, the increased flow through orifice 18 will cause spool 30 to shift leftwardly and reduce the flow across notches 38 until the pressure drop across orifice 18 returns to its previous level.

If, for example, the combine begins to climb a hill and the drive power is provided through function 14, the pump 12 will increase its pressure level. The increased pressure in cavity 26 will cause motor 16 to increase its speed. As the flow begins to increase across orifice 18, the increased pressure drop is sensed and spool 30 again will further restrict flow across notches 38 until the pressure drop across orifice 18 returns to its previous level as set by spring 32.

Prior art flow control valves have an optimum performance curve only at one flow rate across their variable orifice 18. The reason for this is that the dynamic forces on the spool in a metering condition (momentum-exchange, "Bernoulli effect", viscous drag, etc.) vary at the same rate as the spring force only at one flow rate.

When it is desirous to run the motor 16 at a different speed, variable orifice 18 is manually opened to, for example, a larger opening. To achieve a sufficient pressure drop across orifice 18, to balance spring 32, will require greater flow across orifice 18. This increased flow rate will also pass across spool 30 and create different dynamic forces, as previously mentioned, on the spool as compared with the spring force on the spool.

The present invention involves positioning a vent passage 36 in spool land 44, just downstream of the high velocity fluid jet 52 (indicated by an arrow). The fluid jet 52 tends to pull fluid out of the vent passage 36 thereby decreasing the pressure in servo chamber 34, but having no effect on the pressure drop across orifice 18. This pressure drop caused by the exiting jet is substantially linear with the pressure drop and flow rate across spool 30. Therefore, by proper placement of the vent passage 36 and/or sizing of the spool 30, it is possible to add an additional compensating force whose rate of change will offset the changed rate of the dynamic forces on the spool and rate of change of spring force, so that the combined forces on the spool will be substantially linear and the flow control valve will provide an optimum performance curve at all flow rates.

Figure 2:
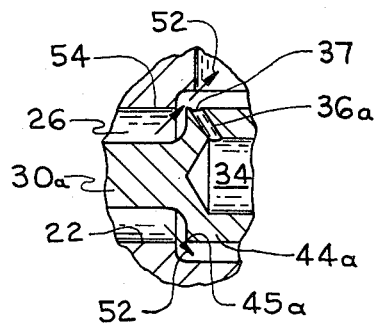
FIG. 2 is a partial longitudinal section of the valve spool illustrating a modified form of the present invention.

FIG. 2 illustrates a modified spool design without metering notches. Spool land 44a has a square edge 45a and in its metering mode, provides a high velocity jet 52 in an annular pattern which exits the pressurized cavity 26 into exhaust cavity 28 at an angle of approximately 69°. Vent passage 36a is angled toward land edge 45a to place its opening 37 in close proximity to jet 52.

Having described the invention with sufficient clarity to enable those familiar with the art to construct and use it, we claim:

1. In a control valve having a valve spool which is positioned by varying axial forces thereon; the spool having alternately spaced grooves and lands, and a conventional valve body having a bore in which the spool is slidable from a closed position to at least one metering position providing restricted flow from a pressurized cavity in the body across a notch to an exhaust cavity in the body and at least one servo chamber acting on an end surface of the spool for positioning the spool, the improvement comprising:
   a metering land on the valve spool;
   at least one metering notch positioned between the metering land and the valve bore;
   a vent passage means in the metering land connected to the servo chamber and positioned downstream of one of the metering notches and substantially axially aligned with said notch whereby the fluid jet exiting the notch has a tendency to pull fluid from the vent passage and decrease the pressure in the servo chamber whereby certain forces on the spool when in a fluid dynamic state can be cancelled so that the control valve will be unaffected by changing flows through the valve and varying pressure drops across the valve.

2. In a control valve having a spool which is positioned by varying axial forces thereon; the spool having alternately spaced square grooves and lands, and a conventional valve body having a bore in which the spool is slidable from a closed position to at least one metering position providing restricted flow from a pressurized cavity in the body across the spool to a square edged exhaust cavity in the body and at least one servo chamber acting on an end surface of the spool for positioning the spool, the improvement comprising:
   a square-edge metering land on the valve spool;
   a vent passage means in the metering land connected to the servo chamber, the opening of the vent passage in the land being positioned adjacent the land edge and downstream thereof whereby the fluid jet exiting the pressurized cavity has a tendency to pull fluid from the vent passage and decrease the pressure in the servo chamber whereby certain forces on the spool when in a fluid dynamic state can be cancelled so that the control valve will be unaffected by changing flows through the valve and varying pressure drops across the valve.

3. In a control valve as set forth in claim 1, wherein the metering notch is in the edge of the metering land.

4. In a control valve as set forth in claim 1, wherein the metering notch is in the metering land.

5. In a control valve as set forth in claim 1, wherein the metering notch is shaped to cause the fluid jet to exit the notch at an obtuse angle from the axis of the spool.

6. In a control valve as set forth in claim 1, wherein the bore in the valve body between the pressurized cavity and the exhaust cavity is shaped as a conventional square-edge sealing land.

7. In a control valve as set forth in claim 1, including a sealing land in the valve body bore wherein the metering notch is in the sealing land.

* * * * *